US012608644B2

(12) United States Patent
Wang et al.

(10) Patent No.: US 12,608,644 B2
(45) Date of Patent: Apr. 21, 2026

(54) GENERATING A CONFIGURATION PORTFOLIO INCLUDING A SET OF MODEL CONFIGURATIONS

(71) Applicant: Microsoft Technology Licensing, LLC, Redmond, WA (US)

(72) Inventors: Chi Wang, Redmond, WA (US); Mohammad Saad Abdul Karim Kayali, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1124 days.

(21) Appl. No.: 17/584,161

(22) Filed: Jan. 25, 2022

(65) Prior Publication Data

US 2023/0237367 A1 Jul. 27, 2023

(51) Int. Cl.
*G06N 20/20* (2019.01)
*G06N 20/00* (2019.01)

(52) U.S. Cl.
CPC .................................. *G06N 20/00* (2019.01)

(58) Field of Classification Search
CPC ........ G06N 20/00; G06N 3/096; G06N 3/098; G06N 3/0985; G06N 3/10; G06N 5/01; G06N 20/20; G06N 3/045
See application file for complete search history.

(56) References Cited

U.S. PATENT DOCUMENTS

| | | | | |
|---|---|---|---|---|
| 2020/0104337 | A1* | 4/2020 | Kelly | H04L 51/52 |
| 2022/0114301 | A1* | 4/2022 | Natarajan | G06F 30/27 |
| 2022/0147540 | A1* | 5/2022 | Rossi | G06F 3/0482 |
| 2024/0169263 | A1* | 5/2024 | Solmaz | G06N 20/00 |

OTHER PUBLICATIONS

"H20 AutoML: Automatic Machine Learning", http://docs.h2o.ai/ h2o/latest-stable/h2o-docs/automl.html, Oct. 29, 2020, 19 Pages.
Agrawal, et al., "Cloudy with High Chance of DBMS: A 10-year Prediction for Enterprise-Grade ML", In Proceedings of 10th Annual Conference on Innovative Data Systems Research, Jan. 12, 2020, 8 Pages.

(Continued)

*Primary Examiner* — Sanchita Roy
(74) *Attorney, Agent, or Firm* — Ray Quinney & Nebeker P.C.; James S. Bullough

(57) ABSTRACT
This disclosure relates to implementing a configuration portfolio having a compact set of model configurations that are predicted to perform well with respect to a wide variety of input tasks. Systems described herein involve evaluating machine learning models with respect to a set of training tasks to generate a regret matrix based on accuracy of the machine learning models in connection with predicting outputs for the training tasks. The systems described herein can identify a subset of model configurations from a plurality of model configurations based on the subset of model configurations having lower associated metrics of regret with respect to the training tasks. This ensures that each model configuration within the configuration portfolio will perform reasonably well for a given input task and provides a mechanism for selecting an output model configuration using significantly fewer processing resources than conventional model selection systems.

19 Claims, 7 Drawing Sheets

(56)            References Cited

OTHER PUBLICATIONS

Bergstra, et al., "Random Search for Hyper-Parameter Optimization", In Journal of Machine Learning Research, vol. 13, Feb. 1, 2012, pp. 281-305.
Chen, et al., "XGBoost: A Scalable Tree Boosting System", In Proceedings of the 22nd ACM SIGKDD International Conference on Knowledge Discovery and Data Mining, Aug. 13, 2016, pp. 785-794.
Das, et al., "Amazon SageMaker Autopilot: a White Box AutoML Solution at Scale", In Proceedings of the Fourth International Workshop on Data Management for End-to-End Machine Learning, Jun. 14, 2020, pp. 1-7.
Doraiswamy, et al., "Identifying Robust Plans through Plan Diagram Reduction", In Proceedings of the VLDB Endowment, vol. 1, Issue 1, Aug. 23, 2008, pp. 1124-1140.
Erickson, et al., "Autogluon-Tabular: Robust and Accurate Automl for Structured Data.", https://arxiv.org/pdf/2003.06505.pdf, Mar. 13, 2020, 28 Pages.
Feurer, et al., "Auto-Sklearn 2.0: The Next Generation", https://arxiv.org/pdf/2007.04074v1.pdf, Jul. 8, 2020, 18 Pages.
Feurer, et al., "Efficient and Robust Automated Machine Learning", In Journal of Advances in Neural Information Processing Systems, Dec. 7, 2015, 9 Pages.
Gijsbers, et al., "An Open Source AutoML Benchmark", https://arxiv.org/pdf/1907.00909.pdf, Jul. 1, 2019, 8 Pages.
Gijsbers, et al., "Meta-Learning for Symbolic Hyperparameter Defaults", In Proceedings of the Genetic and Evolutionary Computation Conference Companion, Jul. 10, 2021, pp. 151-152.
Guyon, et al., "Design of the 2015 ChaLearn AutoML Challenge", In Proceedings of International Joint Conference on Neural Networks (IJCNN), Jul. 12, 2015, 8 Pages.
Hand, et al., "A Simple Generalisation of the Area Under the ROC Curve for Multiple Class Classification Problems", https://link.springer.com/content/pdf/10.1023/A:1010920819831.pdf, Nov. 2001, pp. 171-186.
Hutter, et al., "Sequential Model-Based Optimization for General Algorithm Configuration", In Learning and Intelligent Optimization, Jan. 17, 2011, pp. 507-523.
Ke, et al., "Lightgbm: A Highly Efficient Gradient Boosting Decision Tree", In Proceedings of 31st Conference on Neural Information Processing Systems, Dec. 4, 2017, 9 Pages.
Lavesson, et al., "Quantifying the Impact of Learning Algorithm Parameter Tuning", In Proceedings of the 21st National Conference on Artificial Intelligence—vol. 1, Jul. 16, 2006, pp. 395-400.

Li, et al., "VolcanoML: Speeding up End-to-End AutoML via Scalable Search Space Decomposition", In Proceedings of the VLDB Endowment, vol. 14, No. 11, Nov. 2021, pp. 2167-2176.
Olson, et al., "Automating Biomedical Data Science through Tree-Based Pipeline Optimization", In Proceedings of European Conference on the Applications of Evolutionary Computation, Mar. 30, 2016, 16 Pages.
Pedregosa, et al., "Scikit-learn: Machine Learning in Python", In Journal of Machine Learning Research, vol. 12, Nov. 1, 2011, pp. 2825-2830.
Pfisterer, et al., "Learning Multiple Defaults for Machine Learning Algorithms", In Proceedings of the Genetic and Evolutionary Computation Conference Companion, Jul. 10, 2021, pp. 241-242.
Prokhorenkova, et al., "Catboost: Unbiased Boosting with Categorical Features", In 31st Conference on Neural Information Processing Systems, Dec. 3, 2018, 11 Pages.
Shang, et al., "Democratizing Data Science through Interactive Curation of ML Pipelines", In Proceedings of the International Conference on Management of Data, Jun. 30, 2019, pp. 1171-1188.
Wang, et al., "FLAML: A Fast and Lightweight AutoML Library", In Fourth Conference on Machine Learning and Systems, May 19, 2021, 14 Pages.
Wolpert, et al., "No Free Lunch Theorems for Optimization.", In Proceedings of IEEE Transactions on Evolutionary Computation, vol. 1, Issue 1, Apr. 1, 1997, pp. 67-82.
Wu, et al., "ChaCha for Online AutoML", In Proceedings of the 38th International Conference on Machine Learning, Jul. 24, 2021, 11 Pages.
Yakovlev, et al., "Oracle AutoML: A Fast and Predictive AutoML Pipeline", In Proceedings of the VLDB Endowment, vol. 13, Issue 12, Aug. 2020, pp. 3166-3180.
Zoph, et al., "Neural Architecture Search with Reinforcement Learning", In Proceedings of 5th International Conference on Learning Representations, Apr. 24, 2017, 16 Pages.
Dubatovka, et al., "Ranking Architectures using Meta-Learning", In Repository of arXiv:1911.11481v1, Nov. 26, 2019, pp. 1-10.
Feurer, et al., "Auto-Sklearn 2.0: Hands-free AutoML via Meta-Learning", In Repository of arXiv:2007.04074v2, Sep. 2, 2021, pp. 1-56.
Kayali, et al., "Mining Robust Default Configurations for Resource-constrained AutoML", In Repository of arXiv:2202.09927v1, Feb. 20, 2022, 11 Pages.
"International Search Report and Written Opinion Issued in PCT Application No. PCT/US22/053433", Mailed Date: Apr. 25, 2023, 11 Pages.

* cited by examiner

100

Client Device *122*

Network *124*

Computing Device(s) *102*

Configuration Portfolio Management System *104*

Input Selection Manager *106*

Task Selector *108*

Configuration Selector *110*

Portfolio Generation Manager *112*

Regret Matrix Generator *114*

Portfolio Generator *116*

Configuration Selection Manager *118*

Data Storage *120*

Task Data

Configuration Data

Regret Data

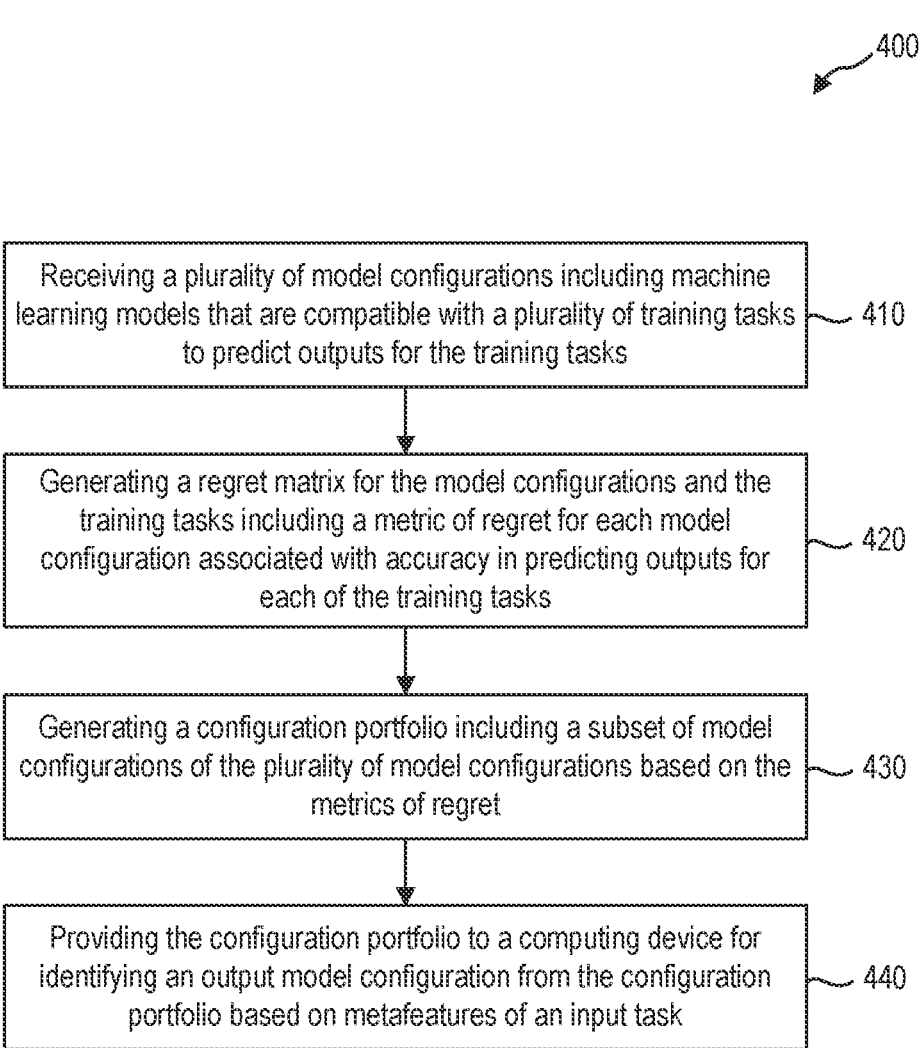

Receiving a plurality of model configurations including machine learning models that are compatible with a plurality of training tasks to predict outputs for the training tasks ⟿ 410

Generating a regret matrix for the model configurations and the training tasks including a metric of regret for each model configuration associated with accuracy in predicting outputs for each of the training tasks ⟿ 420

Generating a configuration portfolio including a subset of model configurations of the plurality of model configurations based on the metrics of regret ⟿ 430

Providing the configuration portfolio to a computing device for identifying an output model configuration from the configuration portfolio based on metafeatures of an input task ⟿ 440

GENERATING A CONFIGURATION PORTFOLIO INCLUDING A SET OF MODEL CONFIGURATIONS

BACKGROUND

Recent years have seen significant improvements and developments in machine learning models that are trained to generate outputs and perform various tasks. Indeed, as machine learning models become more prevalent and complex, the utility of machine learning models continues to increase. For instance, machine learning technology is now being used in applications of transportation, healthcare, criminal justice, education, and productivity. Moreover, machine learning models are often trusted to make high-stakes decisions with significant consequences for individuals and companies.

While machine learning models provide useful tools for processing content and generating a wide variety of outputs, accuracy and reliability of machine learning models continues to be a concern. In addition, tools for determining the effectiveness and selecting models to train with respect to various inputs are often flawed or expensive to implement. Indeed, conventional tools for generating and selecting machine learning models often involve training a large number of models and determining which of the models would be effective for a particular set of inputs. Training or otherwise obtaining a large number of models can be extremely expensive and often requires a massive quantity of computing resources. Moreover, even upon obtaining a large number of models, it is generally difficult and computationally prohibitive to determine which model to use from a sizable collection of machine learning models.

These and other problems exist in connection with selecting model configurations to use in connection with processing input tasks.

BRIEF DESCRIPTION OF THE DRAWINGS

FIG. 4 illustrates a first example series of acts for generating a configuration portfolio in accordance with one or more embodiments.

DETAILED DESCRIPTION

Figure 1:
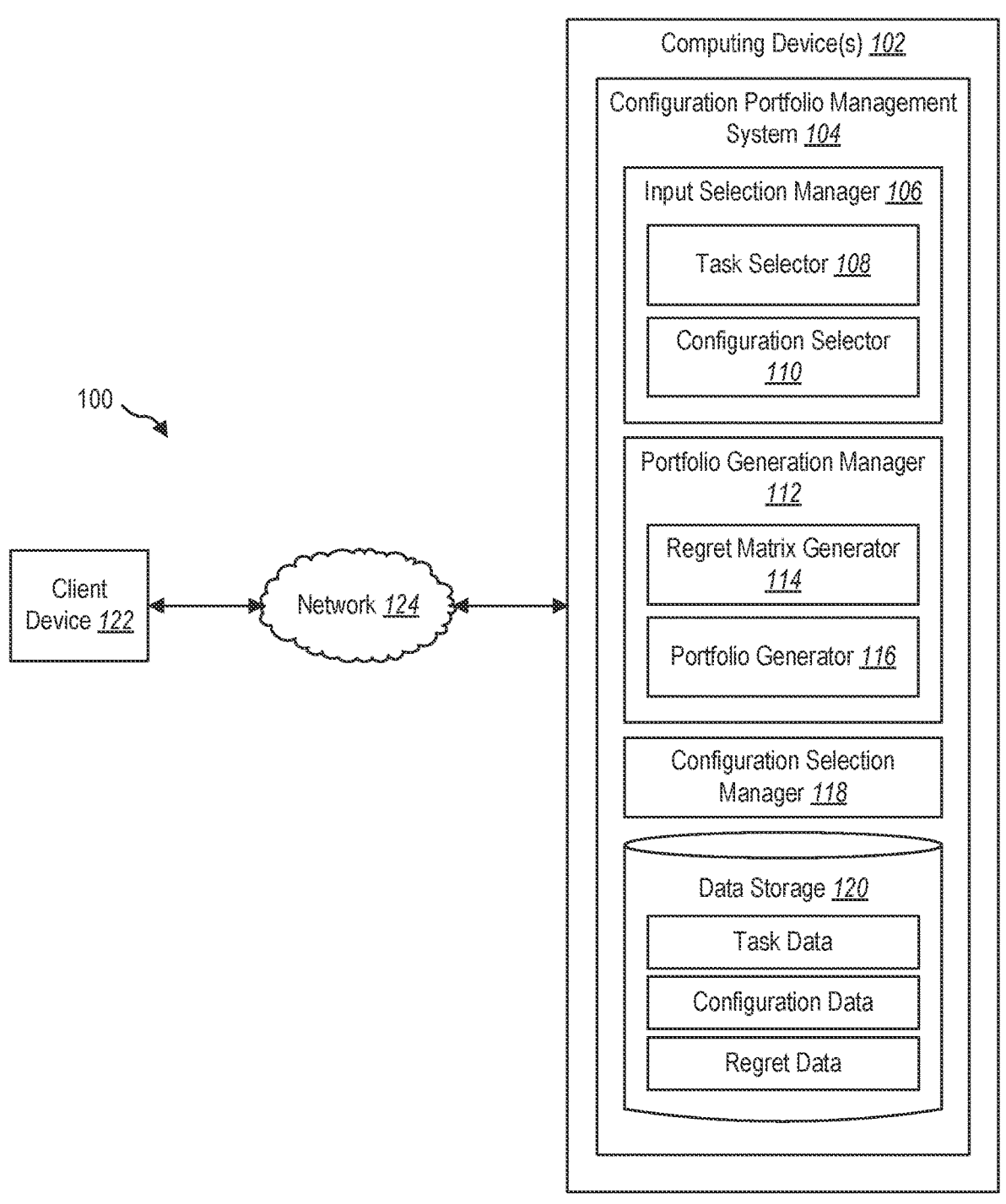
FIG. 1 illustrates an example environment including a configuration portfolio management system in accordance with one or more embodiments.

The present disclosure relates to systems and methods for generating a configuration portfolio including a number of candidate model configurations that are predicted to perform well with respect to a wide variety of input tasks. In one or more embodiments described herein, a configuration portfolio management system can evaluate a plurality of model configurations in connection with a plurality of training tasks to selectively identify a subset of the model configurations to include within a configuration portfolio. As will be discussed in further detail below, the configuration portfolio management system may generate the configuration portfolio by generating a record (e.g., a regret matrix) including metrics of regret (or simply "regret metrics") for the plurality of model configurations, which may be used to selectively identify a compact group of model configurations that are predicted to perform well for a wide variety of input tasks having a variety of metafeatures (e.g., features of a dataset of the task).

As an illustrative example in accordance with one or more embodiments described herein, the configuration portfolio management system can receive a plurality of model configurations including machine learning models and associated hyperparameters, the model configurations being compatible to predict outputs for a plurality of training tasks based on datasets of the training tasks. The configuration portfolio management system may generate a regret matrix for the model configurations including metrics of regret for the model configurations in predicting outputs with respect to the training tasks. Based on the metrics of regret from the regret matrix, the configuration portfolio management system may selectively identify a subset of candidate models from the plurality of model configurations to include within a configuration portfolio. The configuration portfolio may be provided to a computing device (e.g., a client device, a cloud computing server) for use in identifying a model configuration from the configuration portfolio.

In addition to generating the configuration portfolio, the systems described herein further include features related to using the configuration portfolio to determine a model configuration from the compact portfolio that will perform well with respect to an input task (e.g., that will accurately predict output labels for the input task). In particular, and as will be discussed in further detail below, the configuration portfolio management system may compare metafeatures of an input task against metafeatures for a set of training tasks used in generating the configuration portfolio. Based on this comparison and based on regret data (e.g., from the regret matrix), the configuration portfolio management system may identify a model configuration predicted to perform well for the input task.

The present disclosure provides a number of practical applications that provide benefits and/or solve problems associated with selecting and training a model configuration for an input task. Some examples of these benefits and associated features of the configuration portfolio management system are discussed in further detail below. Additional examples will be discussed herein in connection with specific examples and use-cases.

As a first example, one or more embodiments of the configuration portfolio management system generates a compact set of model configurations from which a candidate model configuration is selected for a particular input task. By generating a compact set of model configurations, the configuration portfolio management system can significantly reduce a number of machine learning models to be trained with respect to an input task. For example, where conventional systems for selecting machine learning models for a given task may involve training a significant number of machine learning models to determine which of several machine learning models will perform well, one or more embodiments described herein involve selecting a single model configuration based on an assumption that the selected model will perform reasonably well with respect to the input task and accurately predict outputs for the input task.

In one or more embodiments, the configuration portfolio management system selects the model configurations to include within the configuration portfolio based on metric(s) of regret between the model configurations and a set of training tasks. By selectively including those model configurations having a low metric of regret (e.g., a combined regret metric less than a predetermined threshold) with respect to a number of training tasks, the configuration portfolio management system ensures that the configuration portfolio includes at least one model configuration for an input task that will perform reasonably well for the input task. This selective generation of the subset of model configurations enables the configuration portfolio management system to select a single model configuration which, as indicated above, significantly reduces a number of machine learning models that need to be trained in order to find a machine learning model that is predicted to perform accurately for the input task.

In one or more embodiments, the configuration portfolio management system considers a plurality of training tasks having a variety of metafeatures in evaluating performance of a set of model configurations. By considering a variety of training tasks that have a wide range of metafeatures, the configuration portfolio management system can ensure that the configuration portfolio has one or more model configurations that work well for a previously unknown input task (e.g., an input task for which label data is not previously known). Indeed, as will be discussed in further detail below, the configuration portfolio management system may selectively consider a plurality of training tasks having metafeature values (e.g., number of dataset instances, number of features, number of classes, percentage of numeric feature) that differ in range from one another on a scale of multiple orders (e.g., orders of $10^1$, $10^2$, $10^3$, $10^4$, $10^5$, $10^6$). In this manner, the resulting configuration portfolio may include model configurations that are well-equipped to perform at a high level with respect to an input task having a high potential of variation in metafeatures.

As will be discussed in further detail below, the configuration portfolio management system may implement features in generating the configuration portfolio that prevents the model configurations from being overfitted to a particular set of training tasks. For example, where conventional systems for training and selecting machine learning models may involve selection from 100s or 1000s of potential models, this often results in a selected model being overfitted to a particular set of training tasks and causing a selected machine learning model to perform poorly for an input task that includes previously unknown data. In contrast, one or more embodiments of the configuration portfolio management system described herein consider metrics of regret that incorporate a notion of excess regret beyond a minimum threshold difference from a best performing model configuration. Further, as indicated above, the configuration portfolio management system may consider a sum of metrics for a diverse set of training tasks, further reducing the likelihood of overfitting a model configuration to a specific training task.

One or more embodiments described herein involve sampling configurations and training tasks as well as evaluating performance of the model configurations during an offline stage(s). As such, where conventional techniques for selecting and training models are often done based on receiving an input task, embodiments of the configuration portfolio management system described herein involve generating the configuration portfolio during an offline period and going online after the compact portfolio is created. Indeed, by providing the compact configuration portfolio and a select set of regret data, a computing device may select a single model configuration for training with a high degree of confidence that the selected model configuration will perform well. This allows for processing intensive tasks to be performed prior to involvement of a resource-constrained device, which can significantly reduce processing expense on a computing device that receives an input task and/or request to identify a model configuration to apply to the input task.

Moreover, in one or more embodiments described herein, the configuration portfolio management system utilizes a zero-shot algorithm approach in selecting a model configuration to apply to an input task having no labels associated therewith. For instance, rather than training a model to evaluate performance of one or more model configurations with respect to an input task, the configuration portfolio management system may implement a zero-shot model selection algorithm in which an input task does not have any known labels. Indeed, as will be discussed below, the zero-shot model selection algorithm enables selection of a model configuration without evaluating performance of the model configuration for the input task. Instead, the configuration selection manager 118 may compare a set of metafeatures for an input task to metafeatures from a set of training tasks to identify a training task that has a similar set of metafeatures to the input task. This similarity may be used to identify a specific model configuration based on previously determining (e.g., during the offline stage) that the model configuration produces accurate predictions with respect to the training task having the similar set of metafeatures as the input task.

As will be discussed in further detail below, based on the comparison of metafeatures and an indication of which model configuration from a configuration portfolio performed optimally with respect to the identified training task, the configuration portfolio management system 104 may efficiently and confidently determine that a specific model configuration will have a high probability of performing well with respect to the input task. Accordingly, the configuration portfolio management system can selectively identify the model configuration to use in applying to the data of the input task.

As illustrated in the foregoing discussion, the present disclosure utilizes a variety of terms to described features and advantages of one or more embodiments of a configuration portfolio management system. Additional detail will now be provided regarding the meaning of some of these terms. These and additional terms will be discussed in additional detail in connection with one or more embodiments and specific examples below.

As used herein, a "model configuration" or simply "configuration" refers to a model (e.g., a machine learning model) and an associated set of hyperparameters (e.g., a hyperparameter configuration). In one or more embodiments described herein, a model configuration refers specifically to a pairing of a machine learning model and a set of hyperparameters that define one or more parameters or settings under which the machine learning model operates. Different model configurations may include similar machine learning models or similar hyperparameters. For example, a first model configuration may include a machine learning model and a first set of hyperparameters while a second model configuration may include the same machine learning model and a second set of hyperparameters. As another example, a first model configuration may include a machine learning model and a set of hyperparameters while a second model configuration may include a different machine learning model and the same set of hyperparameters.

As used herein, a "machine learning model" may refer to a computer algorithm or model (e.g., a classification model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

As used herein, a "hyperparameter" may refer to features (e.g., tunable features) of a machine learning model that affect performance of the model with respect to processing inputs and generating outputs. Example hyperparameters may include a machine library or a characteristic (e.g., a structural characteristic) of a machine learning model. In one or more embodiments, a hyperparameter refers to a structure of a machine learning model, such as a decision tree classifier (or any other model structure). In addition, a hyperparameter may indicate characteristics of the machine learning model such as a depth of the tree, a number of leaves or branches, a depth of the model, or any other features that may be adjusted between machine learning models.

As used herein, a "task" may refer to a dataset having features and labels associated with one or multiple instances within the dataset. A task may generally refer to data and associated metadata (e.g., metafeatures) on which a function or analysis is to be performed by a machine learning model to determine or predict outputs based on data from the task. In one or more embodiments described herein, task may refer to a training task for which features and labels may be known and which may be used to train one or more machine learning models. In one or more embodiments described herein, a task may refer to an input task including data having associated features, but for which labels may not be known prior to selecting a model configuration from a configuration portfolio.

As used herein, a "metafeature" of a task may refer to any characteristic that describes the data or instances of data that make up the task. Examples of metafeatures described herein may include characteristics such as how many rows or instances are included within a task, how many columns are included within the task, how many classes exist within the task, and how many categorical v. numeric features exist within the task dataset. In one or more embodiments described herein, the configuration portfolio management system is configured to consider metafeatures from a list including a number of instances, a number of features, a number of classes, and a percentage of numeric features. Nonetheless, embodiments described herein may consider any number of combination of metafeatures descriptive of a dataset that makes up a given task.

As used herein, a "metric of regret" or simply "regret" may refer to a metric of distance or a value of a comparison between model configurations with respect to a task. For example, a metric of regret may refer to a relative accuracy of a model configuration and another model configuration. In one or more embodiments described herein, a metric of regret refers specifically to a difference in performance (e.g., percent accuracy) between a given model configuration and a best performing model configuration from a set of model configurations (e.g., a set of candidate model configurations). A metric of regret may additionally include other values descriptive of a difference in performance between two model configurations. In one or more embodiments, a collection of metrics of regret for a set of model configurations is maintained within a regret matrix. As used herein, a regret matrix may include any record within which regret data is maintained for a set of model configurations and associated training tasks. In one or more embodiments, a regret matrix is a table of values representative of prediction accuracy, differences in prediction accuracy, or any metric of regret discussed herein.

Additional detail will now be provided regarding a configuration portfolio management system in accordance with one or more illustrated examples. For example, FIG. 1 illustrates an example environment 100 having one or more computing device(s) 102 on which a configuration portfolio management system 104 may be implemented in accordance with one or more embodiments.

As further shown, the environment 100 may further include a client device 122 in communication with the computing device(s) 102 via a network 124. The client device 122 and the computing device(s) 102 may communicate with each other directly or indirectly through the network 124. The network 124 may include one or multiple networks and may use one or more communication platforms or technologies suitable for transmitting data. The network 124 may refer to any data link that enables the transport of electronic data between devices and/or modules of the environment 100. The network 124 may refer to a hardwired network, a wireless network, or a combination of hardwired and wireless networks. In one or more embodiments, the network 124 includes the Internet.

The computing device(s) 102 and/or client device 122 may refer to various types of computing devices. For example, in one or more embodiments, the client device 122 may include a mobile device, such as a mobile telephone, a smartphone, a PDA, a tablet, or a desktop. In one or more embodiments, the client device 122 may include a non-mobile device such as a desktop computer, server device, or other non-portable device. In one or more embodiments described herein, the computing device(s) 102 refers to one or more server devices of a cloud computing system accessible to a client device 122 operated by a user. Each of the computing device(s) 102 and client device 122 may include features and functionality described below in connection with FIG. 6.

In addition, while FIG. 1 illustrates one example implementation in which a configuration portfolio management system 104 is implemented on a computing device 102 as shown in FIG. 1, it will be appreciated that embodiments described herein may include a variety of computing environments in which components of the configuration portfolio management system 104 are distributed across a variety of computing devices. As an example consistent with FIG. 1, the configuration portfolio management system 104 may include components implemented on a cloud computing system and hosted via a service or platform accessing to a client device 122 having access to services provided by the cloud computing system. As an alternative, one or more embodiments may involve implementing one or more components of the configuration portfolio management system 104 across different devices. For instance, the configuration selection manager 118 may be implemented on a different computing device on a different cloud computing platform or, in some instances, be implemented in whole or in part on the client device 122.

As shown in FIG. 1, and as will be discussed in further detail below, the configuration portfolio management system 104 may include a number of components for performing various acts and providing functionalities described herein. By way of example, the configuration portfolio management system 104 may include an input selection manager 106. The input selection manager 106 may perform various acts related to obtaining training tasks and model configurations for use in generating a configuration portfolio.

For example, as shown in FIG. 1, the input selection manager 106 may include a task selector 108. The task selector 108 may obtain any number of training tasks having a variety of characteristics. As noted above, a training task may refer to a dataset having features and labels and which may be used to train one or more model configurations to predict labels from the corresponding features of the dataset. In one or more embodiments, the task selector 108 obtains the training tasks from a database of training tasks, which may include any number of training tasks having a variety of features and labels.

As further shown, the input selection manager 106 may include a configuration selector 110. The configuration selector 110 identify or otherwise obtain any number of model configurations from a search space of model configurations. In one or more embodiments, the configuration selector 110 identifies a set of machine learning models and a number of hyperparameter configurations for use in generating different pairs of models and associated hyperparameters. For example, the configuration selector 110 may generate a set of candidate model configurations to consider in generating a configuration portfolio by mixing and matching different combinations of machine learning models and associated hyperparameter configurations.

In one or more embodiments, the configuration selector 110 may be somewhat selective with regard to identifying a set of input model configurations to consider in generating a configuration portfolio. For example, as will be discussed in further detail below, the configuration selector 110 may determine a set of candidate model configurations for consideration based on accuracy of the candidate model configurations. The configuration selector 110 may identify a set of more accurate model configurations to further consider. In one or more embodiments, the configuration selector 110 identifies model configurations having a threshold percentage (or other metric) of accuracy. In one or more embodiments, the configuration selector 110 may simply identify a threshold percentile of model configurations based on relative accuracy to a larger collection of potential configurations that may be considered in generating the configuration portfolio.

It will be understood that the model configurations considered for the configuration portfolio and the selected training tasks are compatible with one another. For instance, in selecting the candidate model configurations, the configuration selector 110 may selectively consider a collection of model configurations known to be applicable to the datasets of the training tasks to predict outputs based on the associated features of the training tasks. Thus, the search space for the configuration selector 110 and the task selector 108 may be limited to a set of model configurations and training tasks that are compatible with one another.

As further shown in FIG. 1, the configuration portfolio management system 104 may include a portfolio generation manager 112. The portfolio generation manager 112 may generally provide functionality related to evaluating an identified set of model configurations with respect to a set of training tasks to determine metrics of performance of the model configurations with respect to the training tasks. In one or more embodiments, the portfolio generation manager 112 determines a measure of performance for each candidate model configuration with respect to each training task.

As shown in FIG. 2, the portfolio generation manager 112 may include a regret matrix generator 114. In one or more embodiments, the regret matrix generator 114 determines a metric of regret for each combination of model configuration and associated training task. For example, as noted above, the regret matrix generator 114 may determine a measure of performance (e.g., percent accuracy) for each model configuration with respect to each training task. For instance, the regret matrix generator 114 can apply a model configuration to a training task to determine a percentage accuracy that the model configuration will predict a correct label based on one or more corresponding features of the training task. The regret matrix generator 114 may perform a similar analysis for each combination of model configuration and training task.

As will be discussed in further detail below, the regret matrix generator 114 may further determine a metric of regret for each pairing of model configuration and training task. In one or more embodiments, the regret matrix generator 114 generates a matrix including a metric of regret for each of the pairings. As noted above, the metric of regret may indicate a difference in accuracy between each model configuration from a set of candidate model configurations and a best performing model configuration (e.g., from the set of candidate model configurations).

As shown in FIG. 2, the portfolio generation manager 112 may include a portfolio generator 116. As will be described in further detail below, the portfolio generator 116 may selectively identify a subset of model configurations from the set of model configurations represented within the regret matrix to include within a configuration portfolio. The portfolio generator 116 may consider a variety of factors when determining which model configuration to include within the configuration portfolio. In one or more embodiments, the portfolio generator 116 considers a combined metric of regret for a given model configuration and includes the model configuration within the configuration portfolio if the combined metric of regret is below a threshold value. Other implementations may add a best performing model configuration for a given test task. Other implementations may consider a combination of regret while ensuring that the configuration portfolio includes a model configuration having at least a minimum threshold performance accuracy for each of the training tasks. Additional considerations when generating the configuration portfolio will be discussed below.

As shown in FIG. 1, the configuration portfolio management system 104 may include a configuration selection manager 118. As will be discussed in further detail below, the configuration selection manager 118 may select a model configuration from a configuration portfolio that is predicted to perform well for a given input task (e.g., a previously unknown input task). In one or more embodiments, the configuration selection manager 118 may consider regret data from the regret matrix. In one or more embodiments, the configuration selection manager 118 may compare metafeatures of the input task with metafeatures of the training tasks. As will be discussed below, the configuration selection manager 118 may implement a zero-shot approach in which machine learning models from the configuration portfolio need not be further evaluated with respect to the input task, but where a model configuration from the configuration portfolio may be selected based on a comparison of metafeatures between the input task and the training tasks.

As shown in FIG. 1, the components of the configuration portfolio management system 104 may have access to a variety of data on a data storage 120 of the computing device(s) 102. As an example, the data storage 120 may include task data. The task data may include any information or data associated with the training tasks and/or input tasks. This may include any limitations on the type of data from the dataset, such a given set of model configurations may predict labels from the features of the tasks. The task data may include metafeatures of the tasks. For instance, the task data may include metafeatures such as numbers of instances, a number of features, a number of classes, and/or a percentage of numerical features.

As further shown, the data storage 120 may include configuration data. The configuration data may include any information about the various models and hyperparameters that make up the model configurations. For example, the configuration data may include any model data descriptive of the structure and/or algorithms that make up a machine learning model. The configuration data may additionally include any information associated with a set of hyperparameters that may be associated with and affect how a given machine learning model will operate when applied to a task.

As further shown, the data storage 120 may include regret data. The regret data may include any metric of regret determines for a set of model configurations and associated set of training tasks. For example, the regret data may include specific values indicating a measure of regret between two or more model configurations for a given training task. In one or more embodiments, the regret data may include an indication of a best performing model configuration for a training task or simply an indication of any model configurations that perform above a threshold measure of accuracy for one or multiple training tasks.

As discussed in some detail above, it will be understood that while FIG. 1 illustrates an example environment 100 in which each of the components 1006-120 of the configuration portfolio management system 104 are implemented in whole on the computing device(s) 102, other implementations may include one or more components (or sub-components) implemented across different devices of the environment 100. As a non-limiting example, one or both of the input selection manager 106 and the portfolio generation manager 112 may be implemented on a set of server devices of a cloud computing system while the configuration selection manager 118 is implemented on a different set of server devices of the same or different cloud computing system. In this example, the client device 122 may identify or provide an input task and request a model configuration that could be expected to perform well in predicting labels for the input task.

As an alternative to the example shown in FIG. 1, in one or more embodiments, the configuration selection manager 118 may be implemented on a client device while remaining components of the configuration portfolio management system 104 would be implemented on a cloud computing system. As will be discussed in further detail below, implementation of input selection and offline processing components of the configuration portfolio management system 104 would enable implementation of the configuration selection manager 118 on a variety of computing devices, such as the client device 122 or other resource constrained device. Indeed, by providing a configuration portfolio with a compact set of model configurations, the configuration portfolio management system 104 may enable a resource constrained device to accurately identify a model configuration for an input task rather easily, and without having to train or evaluate a large number of model configurations, as is often done by conventional model selection systems.

Figure 2A:
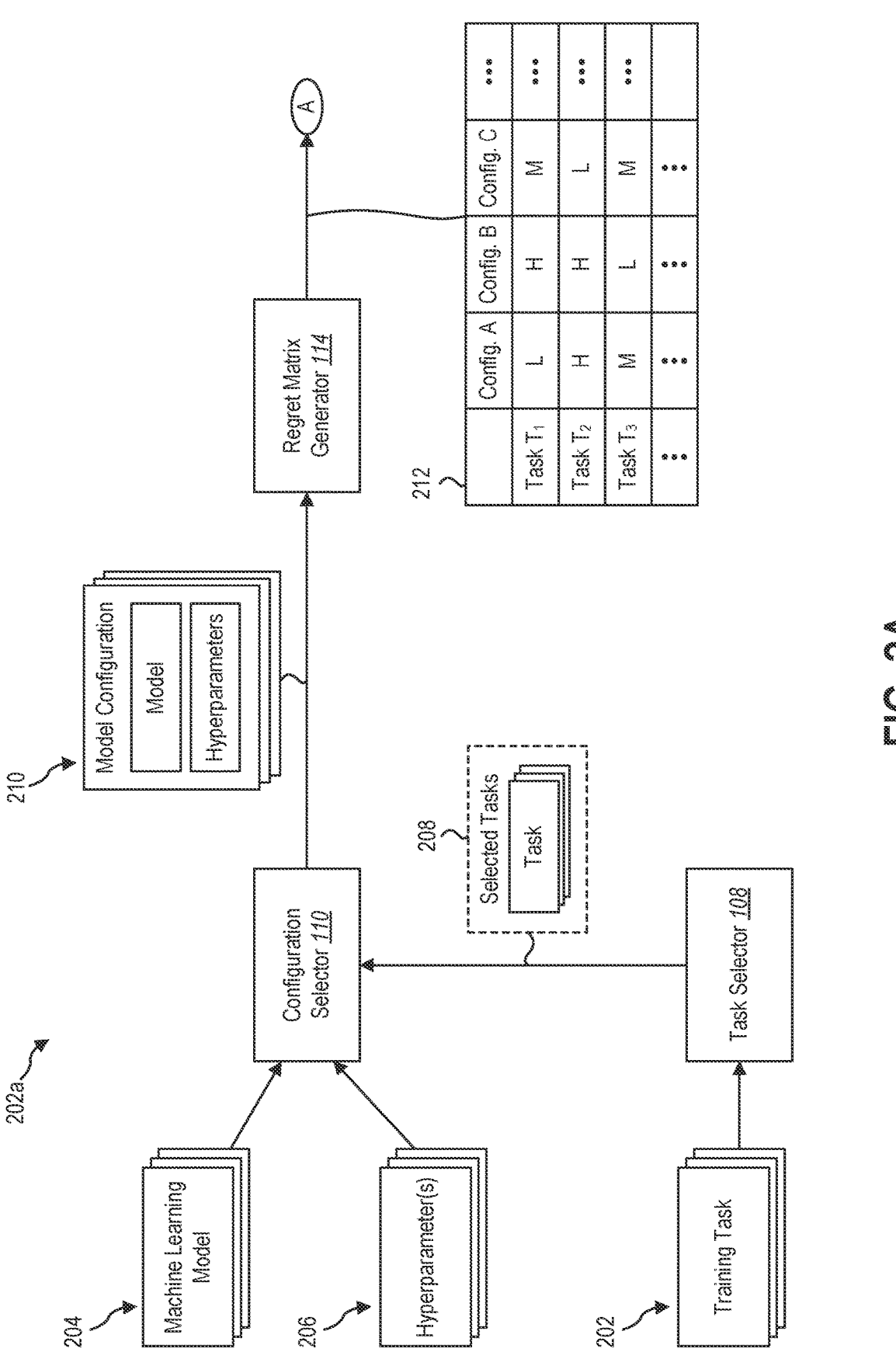
FIG. 2A illustrates an example workflow showing implementation of the configuration portfolio management system in connection with generating a configuration portfolio.
Figure 2B:
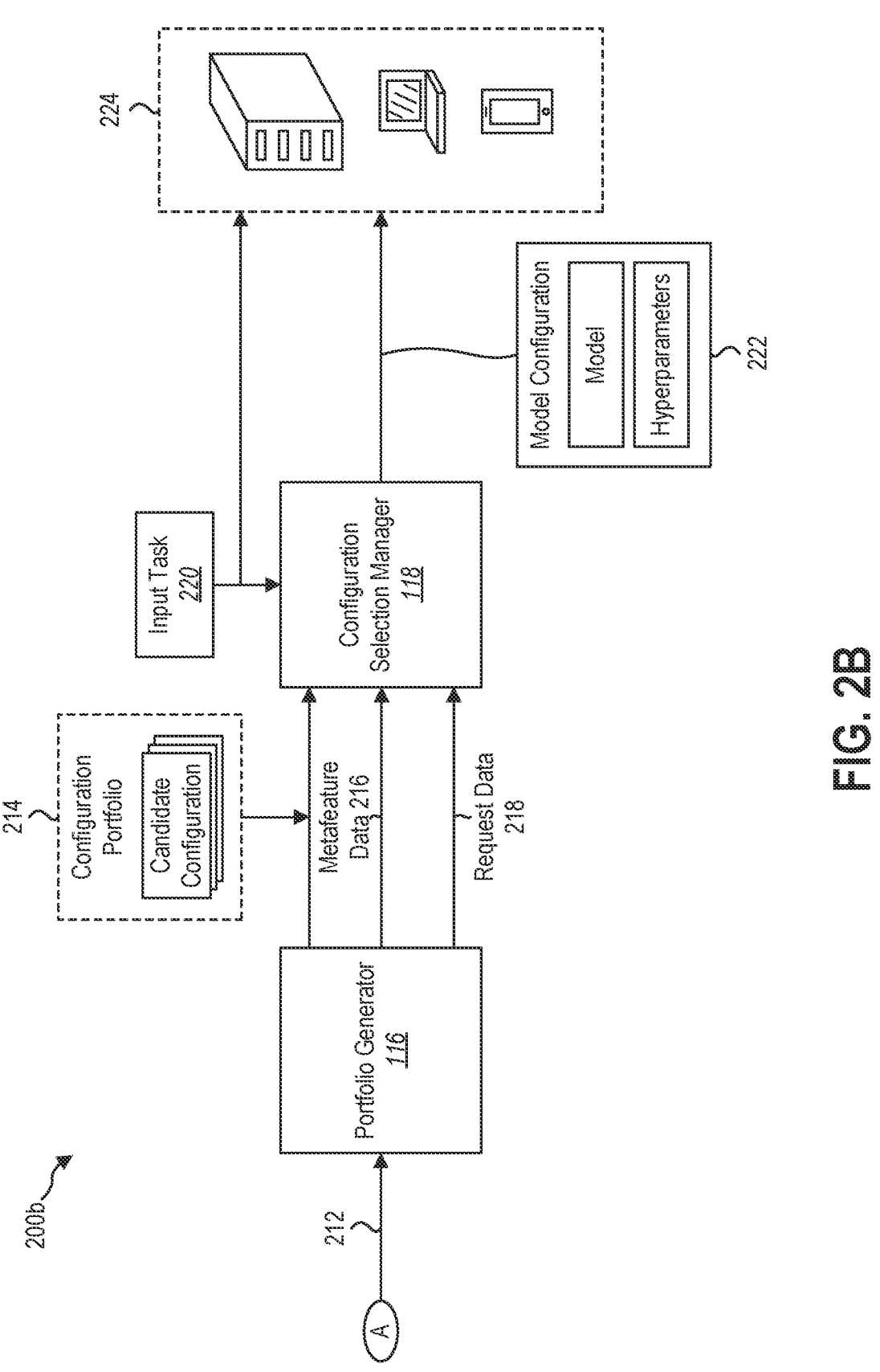
FIG. 2B illustrates an example workflow showing implementation of the configuration portfolio management system in connection with utilizing the configuration portfolio to select a model configuration.

Additional information will now be discussed in connection with FIGS. 2A-2B, which illustrates an example workflow that may be implemented by the configuration portfolio management system 104 shown in FIG. 1. For example, FIG. 2A illustrates a series of acts that may be performed by components of the configuration portfolio management system 104 to generate a regret matrix in accordance with one or more embodiments described herein. FIG. 2B further illustrates a series of acts that may be performed by components of the configuration portfolio management system 104 to identify a candidate model configuration that would be expected to perform well with respect to an input task.

In particular, FIG. 2A illustrates an example workflow 200a related to generating a regret matrix in accordance with one or more embodiments described herein. As shown in FIG. 2A, a task selector 108 may obtain or otherwise access a set of training tasks 202 to further consider in evaluating performance of a set of model configurations. As noted above, the training tasks 202 may refer to any collection of tasks including a wide variety of datasets. The training tasks 202 may include datasets having any number of features and associated labels. As shown in FIG. 2A, the task selector 108 may provide a set of selected tasks 208 to a configuration selector 110 for use in selectively identifying model configurations to further evaluate with respect to the set of selected tasks 208.

As shown in FIG. 2A, the task selector 108 may evaluate a collection of training tasks 202 to identify a set of selected training tasks 208 having a cross section of desired characteristics. For example, in one or more embodiments, the task selector 108 selectively samples training tasks to include within the selected tasks 208 based on a variety of metafeatures associated therewith. In one or more embodiments, the task selector 108 specifically identifies training tasks to generate a set of selected tasks 208 having threshold differences in the metafeatures across the selected tasks 208. In one or more embodiments, the task selector 108 specifically identifies a diverse set of training tasks such that one or more metafeatures of the selected tasks 208 range in value across one or multiple orders of magnitude (or other metric of difference representative of the metafeature values).

As an illustrative example, where a particular metafeature of a task refers to a size of a dataset, the task selector 108 may specifically identify tasks to include within the selected tasks 208 such that at least one (and preferably multiple) selected training task has a number of instances within a first range of $10^1$-$10^2$ instances, $10^2$-$10^3$, instances, $10^3$-$10^4$ instances, $10^4$-$10^5$ instances, $10^5$-$10^6$ instances, or any other order of magnitude or determined subranges included therein. In one or more embodiments, the task selector 108 may ensure similar ranges of diversity between other metafeatures of the training tasks. As will be discussed in further detail below, ensuring that the selected test instances have a wide range of metafeatures ensures that a resulting configuration portfolio will have at least one model configuration that is well equipped for nearly any input task for which a model configuration is being selected.

As shown in FIG. 2A, the configuration selector 110 may receive model configuration data from one or more sources. As shown in FIG. 2A, the configuration selector 110 may access or otherwise obtain machine learning models 204 that are equipped to generate outputs based on features of the training tasks 202. The machine learning models 204 may refer to a variety of model types having different structures or techniques that they employ when analyzing data and associated features to predict or otherwise determine associated output(s) (e.g., labels). For example, as indicated above, the machine learning models 204 may refer to a variety of model types, such as neural networks, decision trees, or any other algorithm or architecture that may be trained to learn and approximate functions and generate outputs based on data provided as input to the machine learning models 204.

In addition to the machine learning models 204, the configuration selector 110 may receive a plurality of parameters 206. The hyperparameters 206 may refer to individual parameters that may be applied to a given machine learning model. In one or more embodiments, the hyperparameters 206 refer to discrete sets of hyperparameters that may be applied to a corresponding machine learning model. As noted above, the hyperparameters 206 may include libraries and/or characteristics of a machine learning model architecture, such as a depth of a model or other structural parameter.

As discussed herein, the configuration selector 110 may combine the machine learning models 204 and hyperparameters 206 in a variety of ways. In one or more embodiments, the configuration selector 110 mixes and matches a set of associated hyperparameters (e.g., a hyperparameter configuration) with each of the machine learning models 204. A resulting collection of model configurations may include a pairing of each of the machine learning models 204 with each of the different sets of hyperparameters 206. Indeed, the configuration selector 110 may obtain any number of model configurations to consider with respect to a set of selected tasks 208 received from the task selector 108.

In one or more embodiments, the configuration selector 110 may consider a collection of model configurations (e.g., including the machine learning models 204 and associated hyperparameters 206) to selectively identify a set of candidate model configuration 210 having pairings of machine learning models and sets of parameters. In one or more embodiments, the set of candidate models represents a subset of the collection of model configurations assembled or otherwise obtained from the machine learning models 204 and hyperparameters 206.

The configuration selector 110 may consider a number of features of a collection of model configurations in identifying and generating the set of candidate model configurations 210. For example, in one or more embodiments, the configuration selector 110 may identify a subset of model configurations based on the subset of model configurations performing above a threshold level of accuracy with respect to the set of selected training tasks 208. In one or more embodiments, the configuration selector 110 selects a predetermined number of model configurations to include within the set of candidate model configurations 210.

While one or more embodiments involve the set of candidate models 210 being selected based on performance or other characteristics of a larger collection of candidate configurations, it will be understood that the set of candidate model configurations 210 may include any number of model configurations. In one or more embodiments, the set of candidate model configurations 210 simply includes any model configurations assembled from the machine learning models 204 and hyperparameters 206 by the configuration selector 110.

As shown in FIG. 2A, the configuration selector 110 can provide the set of candidate model configurations 210 to a regret matrix generator 114. The regret matrix generator 114 may evaluate performance of the candidate model configurations 210 to the selected training tasks 208 to determine metrics of performance and associated metrics of regret for the different combinations of model configurations and training tasks. As will be discussed below, the regret matrix generator 114 may evaluate performance and determine a metric of regret for each model configuration with regard to predicting labels from associated features for each of the selected training tasks 208.

As shown in FIG. 2A, the regret matrix generator 114 may generate a regret matrix 212 within which the performance metrics and/or metrics of regret are maintained for the candidate model configurations 210 and selected training tasks 208. As noted above, the regret matrix generator 114 may determine a metric of regret for each pairing of model configuration and associated training task such that the regret matrix 212 includes a table of metrics for each of the different pairings.

As indicated above, the metrics of regret may include a measurement of performance or difference in performance between how a given model configuration performs relative to one or more additional model configurations with respect to a training task. For example, in one or more embodiments, the regret matrix generator 114 may determine a best performing model configuration for a training task from a set of candidate models 210. The regret matrix generator 114 may then determine a metric of regret based on a relative performance between each of the model configurations and the best performance model configuration for a given training task.

As an illustrative example, a regret matrix generator 114 may determine a performance metric for each model configuration from the set of candidate model configurations 210 for a first training task from the selected tasks 208. The regret matrix generator 114 may identify a best performing model configuration from the set of candidate model configurations 210. The regret matrix generator 114 may then determine a metric of regret by determining a delta or difference in performance (e.g., percentage accuracy) between each of the model configurations and the best performing model configuration. The regret matrix generator 114 may perform a similar analysis and determine metrics of regret for each model configuration with respect to each training task represented within the regret matrix 212.

In one or more embodiments, the regret matrix generator 114 may include numerical values (e.g., percentage values) indicating metrics of regret or other performance metric for the model configurations and associated training tasks. In the example shown in FIG. 2A, the regret matrix 212 may include a first candidate model configuration (configuration "A"), a second candidate model configuration (configuration "B"), a third candidate model configuration (configuration "C"), and any number of additional candidate model configurations. The regret matrix 212 may additionally include a plurality of training tasks ($T_1$, $T_2$, $T_3$) represented therein. The regret matrix 212 may additionally include metrics of regret for the respective pairs. For illustrative purposes, the metrics of regret may indicate low (L), medium (M), or high (H) values associated with different ranges of deltas between a best performing model configuration and a given pairing of model configuration and training task. Other representations may include numerical values, percentage values, or any other measure representative of regret between the model configurations.

As shown in FIG. 2A, and as further shown in FIG. 2B, the regret matrix generator 114 may provide the regret matrix 212 and any associated data to a portfolio generator 116. The portfolio generator 116 may generate a configuration portfolio 214 by selectively identifying a subset of candidate model configurations based on metrics of regret associated with the candidate model configurations. In one or more embodiments, the portfolio generator 116 identifies a set of model configurations to include within a model portfolio based on a variety of factors.

In one or more embodiments, the portfolio generator 116 considers a combined metric of regret for each candidate model configuration represented within the regret matrix 212. For example, the portfolio generator 116 may identify a subset of candidate configurations to include within the configuration portfolio 214 based on a sum or average or other combination of metrics of regret associated with the candidate models and each of the set of selected training tasks 208. In one or more embodiments, the portfolio generator 116 identifies a predetermined number or percentage of the model configurations to include within the configuration portfolio 214. In one or more embodiments, the portfolio generator 116 selectively adds the model configurations having an associated combined metric above a threshold metric of regret.

While one or more embodiments may involve a simple combination of regret metrics or sum of regret metrics when determining the subset of candidate models to include within the configuration portfolio 214, the portfolio generator 116 may additionally consider a threshold difference in metrics of regret in determining the combined metric of regret. For example, in one or more embodiments, the portfolio generator 116 may consider a combination of excess regret between the candidate model configurations and a best performing model configuration for a given training task.

To illustrate, in one or more embodiments, the portfolio generator 116 may identify a threshold difference in regret to consider in determining excess regret. Where a difference in performance between a given model configuration and a best performing model configuration is less than the threshold difference in regret, the portfolio generator 116 may normalize or equate the metric of regret to a zero value. Thus, only where a difference in performance exceeds a threshold difference in regret between a given model configuration and a best performing model configuration for a training task is the metric of regret a non-zero value. In this example, a combined metric of regret (e.g., a combined metric of excess regret) for a model configuration may refer to a combination (e.g., a sum, average) of excess regret for the model configuration with respect to each training task (e.g., a sum of excess regret between the model configuration and each of the best performing models with respect to each of the training tasks).

In one or more embodiments, considering the sum of regret and, more specifically, the sum of excess regret, can enable the portfolio generator 116 to identify select model configurations that are well equipped to perform well with respect to input tasks having a wide variety of metafeatures. Moreover, by considering excess regret, the portfolio generator 116 minimizes the impact of overfitted models with respect to a given task and only penalizes model configurations in selection of a subset for the configuration portfolio where the difference between performance of the candidate model configuration and a best performing model configuration exceeds the threshold difference. In this manner, the portfolio generator 116 places a heavier weight on large differences in performance relative to a best performing model configuration rather than considering overfitted models to a particular training task. Indeed, these overfitted models may provide less useful information when generating the configuration portfolio 214 as overfitted models to a particular training task may be less useful when processing an input task having a different set of features and labels.

In one or more embodiments, the portfolio generator 116 may generate a configuration portfolio 214 including at least one model configuration that performs above a threshold metric of performance for each training task from the selected set of training tasks 208. For example, in one or more embodiments, the portfolio generator 116 may identify a best performing model configuration for a training task from a set of model configurations having a combined metric of regret below a predetermined threshold. Other implementations may implement an algorithm to ensure that the subset of candidate models have a good or otherwise acceptable range of accuracy with respect to each of the training tasks while ensuring that a combined metric of regret for the selected model configurations is below a threshold combined metric of regret.

In one or more embodiments, the portfolio generator 116 may determine a winning or "best" configuration for each of the training tasks when generating the configuration portfolio 214. In many instances, this may involve simply identifying a model configuration from a set of candidate model configurations having a lowest combined metric of regret (or excess regret) with respect to a given training task. Nevertheless, in one or more embodiments, the sum of excess regret may result in a tie between two or more model configurations. In this event, the portfolio generator 116 may broaden a consideration of regret to include a total combined regret (e.g., as an alternative to excess regret) to break the tie and determine a winner or best model configuration to include within the configuration portfolio 214.

As shown in FIG. 2B, the portfolio generator 116 can provide the configuration portfolio 214 including a compact selection of model configurations to a configuration selection manager 118. In addition to the configuration portfolio 214 or identification of the candidate portfolios that are eligible for selection with respect to an input task, the configuration selection manager 118 may additionally receive metafeature data 216 and regret data 218 from the portfolio generator 116. The metafeature data may include the metafeatures associated with the selected set of training tasks 208. The regret data 218 may include any information from the regret matrix 212. In one or more embodiments, the regret data 218 may specifically include an indication of the winner or best configuration from the configuration portfolio 214 for each of the selected training tasks 208. In one or more embodiments, the configuration selection manager 118 may simply receive an indication of a best model configuration with respect to discrete sets of metafeatures without necessarily receiving any additional information about the associated training tasks.

As mentioned above, and as shown in FIG. 2B, the configuration selection manager 118 may receive the configuration portfolio 214, the metafeature data 216, and the regret data 218 for use in considering a model configuration to use for an input task 220. For example, upon receiving the input task 220, the configuration selection manager 118 may consider features of the input task 220 using a zero-shot algorithm to determine a specific model configuration from the configuration portfolio 214 to use in evaluating the input task 220.

In one or more embodiments, the configuration selection manager 118 specifically selects a model configuration from the configuration portfolio 214 based on a comparison of metafeatures of the input task 220 and the metafeature data 216 associated with the set of selected training tasks 208. For example, the configuration selection manager 118 may identify a set of features for a training task being most similar to a set of metafeatures of the input task 220. Based on this comparison and based on the regret data 218, the configuration selection manager 118 may identify a model configuration that performs the best with respect to the training task associated with the corresponding set of features. For example, the configuration selection manager 118 may identify an indicated winner or best model configuration from the regret data 218 that corresponds to the set of metafeatures that most closely resemble the metafeatures of the input task 220.

The configuration selection manager 118 may compare the metafeatures of the input task 220 with metafeatures of the training tasks in a variety of ways. In one or more embodiments, the configuration selection manager 118 may plot or otherwise map the metafeatures to an n-dimensional metafeature space corresponding to a number of metafeatures that are identified for the different tasks. In one or more embodiments, the configuration selection manager 118 may consider metafeatures from a group including a number of instances, a number of features, a number of classes, and a percentage of numeric features. The configuration selection manager 118 may identify a nearest training task represented by a set of metafeatures within the metafeature space to a location within the metafeature space represented by the metafeatures of the input task 220.

This zero-shot algorithm approach provides a low processing cost solution to identifying a model configuration from the configuration portfolio 214 without requiring or otherwise involving training a number of model configurations or event evaluating performance of the model configurations with respect to the input task 220. Rather, the configuration selection manager 118 may simply combine sets of metafeatures to determine a model configuration that is predicted to perform well for the input task 220 based on a knowledge that the model configuration performed well with respect to a training task having a similar set of metafeatures. This enables the configuration selection manager 118 to identify a single model configuration and do so without evaluating performance or training a number of model configurations. Thus, the configuration selection manager 118 may be implemented in whole or in part on a resource constrained machine, such as a client device (e.g., a personal computer, mobile device), or simply be selected in a very fast and efficient process using any of a variety of computing devices.

As shown in FIG. 2B, the configuration selection manager 118 may identify an output candidate model configuration 222 including a machine learning model and set of hyperparameters that is predicted to perform well when applied to the input task 220. In particular, the output candidate model configuration 222, having previously been evaluated and which is known to perform well with respect to a training task having a similar set of metafeatures as the input task 220, may be confidently selected as a model configuration that is well equipped to accurately predict labels based on features of the input task 220.

In one or more embodiments, the configuration selection manager 118 provides the selected output candidate model configuration 222 to a computing device 224 for further processing. As shown in FIG. 2B, the computing device 224 may receive the input task 220 as well as the output candidate model configuration 222. The computing device 224 may then evaluate the input task 220 to determine labels associated therewith.

Figure 3:
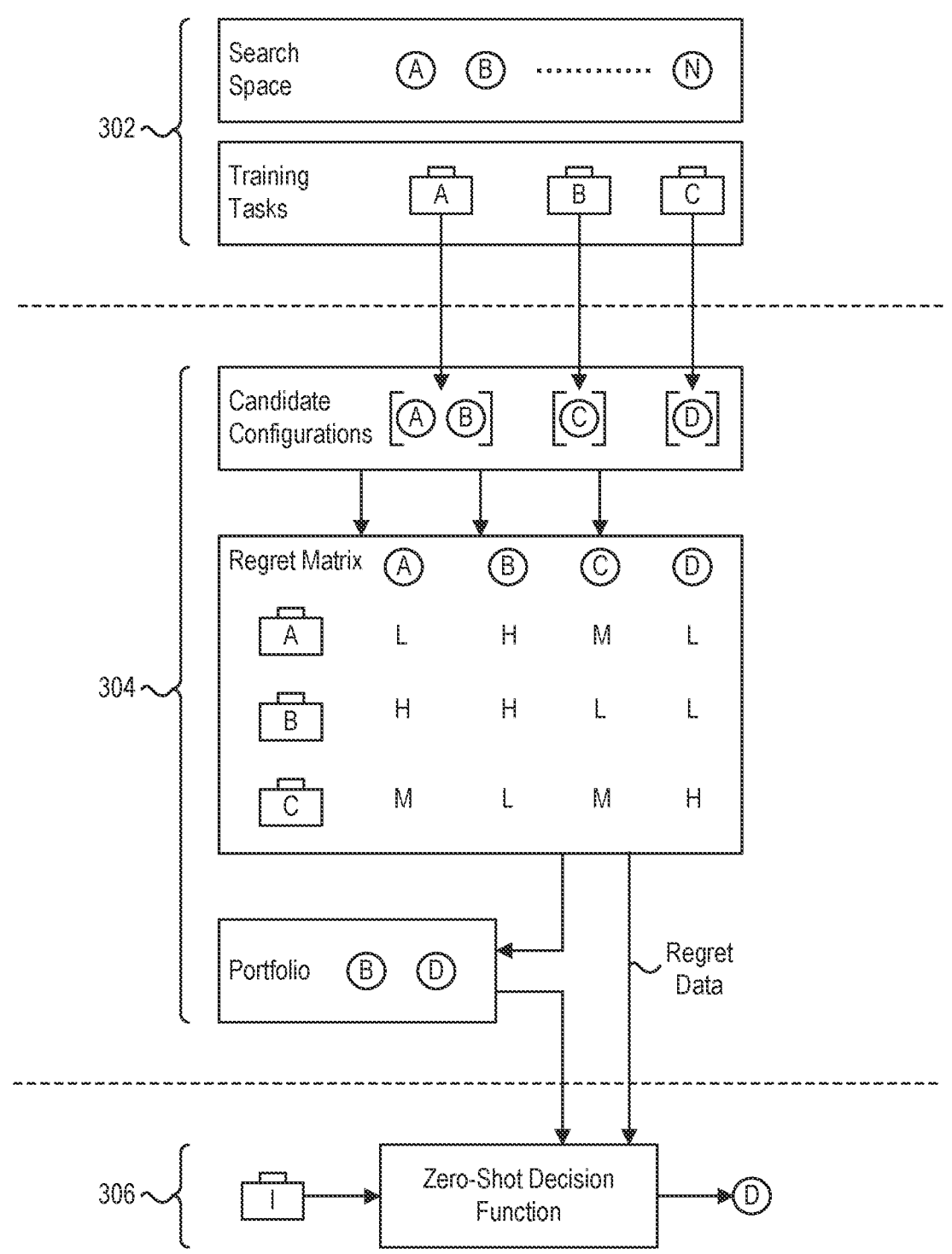
FIG. 3 illustrates another example implementation of the configuration portfolio management system in accordance with one or more embodiments.

FIG. 3 illustrates another example implementation of the configuration portfolio management system 104 in accordance with one or more embodiments described herein. More specifically, FIG. 3 illustrates a series of processing stages that the configuration portfolio management system 104 may implement in accessing model configurations and training tasks to generate a configuration portfolio. FIG. 3 additionally illustrates a stage in which the configuration portfolio may be used to identify a model configuration to use in processing an input task.

For example, as shown in FIG. 3, the configuration portfolio management system 104 may implement a first offline stage 302 or input selection stage that involves identifying model configurations and training tasks for use in generating the configuration portfolio.

As shown in FIG. 3, the first offline stage 302 may involve evaluating a search space of model configurations to identify a collection of model configurations (e.g., model configurations A-N) that are equipped or otherwise compatible to be applied to a set of training tasks (e.g., training tasks A-C) to predict labels for a set of corresponding features of a dataset. As discussed above, selection of the model configurations and training tasks may involve a number of considerations, such as a threshold performance of the model configurations as well as diversity of metafeatures for the training tasks.

As a more specific implementation, the first offline stage 302 may include establishing a baseline by fixing an autoML searcher. The searcher may be run with a large time budget on each training task until timeout or convergence. In the configuration search step, the first offline stage 302 may involve producing a large number of configurations that perform well on at least one training task, even a constrained runtime budget. These selected tasks and model configurations may be further evaluated to generate the regret matrix.

As shown in FIG. 3, a second offline stage 304 may involve evaluating performance of the model configurations to generate a configuration portfolio having a select set of model configurations. In the example shown in FIG. 3, the configuration portfolio management system 104 may identify a set of candidate model configurations including at least one model configuration that performs above a threshold level of accuracy with respect to the training tasks. In this example, the configuration portfolio management system 104 identifies a set of four candidate model configurations (model configurations A, B, C, and D). As shown in FIG. 3, the first and second model configuration (model configurations A-B) may perform above a threshold accuracy with respect to a first training task (Training Task A), a third model configuration (model configuration C) may perform above a threshold accuracy with respect to a second training task (Training Task B), and a fourth model configuration (model configuration D) may perform above a threshold accuracy with respect to a third training task (Training Task C).

In accordance with one or more embodiments described herein, the second offline processing stage 304 may involve generating a regret matrix including a matrix of metrics of regret for each model configuration with respect to each training task. As shown in FIG. 3, the regret matrix may include a metric of regret indicating a metric of difference between each model configuration and each of the training tasks. In the example shown in FIG. 3, the metrics of regret are indicated by a low, medium, or high indicator. Nonetheless, other implementations may involve numerical or percentage measurements indicating notion of regret between different model configurations with respect to each of the training tasks.

As further shown in FIG. 3, the second offline processing stage 304 may involve identifying a compact set of model configurations to include within the configuration portfolio. In the illustrated example, the configuration portfolio management system 104 may identify the second and fourth model configurations (model configurations B and D) based on a combined metric of regret for the second and fourth model configurations.

As an illustrative example, in one or more embodiments, the configuration portfolio management system 104 evaluates the candidate model configurations by evaluating a Cartesian product of model-hyperparameter configurations and training tasks to produce a performance matrix. This performance matrix may be used to build the regret matrix by taking the difference in performance between model configurations and a best performing model configuration for a given training task. As discussed in one or more embodiments herein, the regret matrix can be used to generate the configuration portfolio.

As noted herein, the configuration portfolio may be generated in a variety of ways and based on a variety of criteria. In one or more embodiments, the configuration portfolio management system 104 generates the configuration portfolio as follows. In one or more embodiments, the configuration portfolio management system 104 may construct the configuration portfolio in a bottom-up fashion by building up from an empty set and adding one model configuration at a time. One feature of this process may involve minimizing an error metric by minimizing the sum of excess regret (as discussed above). As noted above, this notion of excess regret can reduce overfitting of the model configurations for a set of training tasks. In addition, by implementing a minimum threshold difference, the configuration portfolio management system 104 may stop a training routine when evaluating performance for a model configuration based on an assumption that further refinement will not matter in determining a sum of excess regret as any additional accuracy for a given model configuration will not contribute to a sum of regret when determining inclusion in the configuration portfolio.

In addition to the notion of excess regret, one or more embodiments of the configuration portfolio management system 104 may implement early stopping. For example, where a target regret is reached or if adding a model configuration to a configuration portfolio does not decrease regret by at least a threshold amount from a previous value, the configuration portfolio management system 104 may stop adding additional model configurations to the configuration portfolio. This ensures that the configuration portfolio stays a compact size such that a computing device that receives and implements the configuration portfolio will not have to search through and evaluate a large number of model configurations.

As shown in FIG. 3, after generating the configuration portfolio, an online processing stage 306 may involve receiving an input task and determining one of the model configurations from the configuration portfolio to use in analyzing or otherwise predicting labels for the input task. In accordance with one or more embodiments described herein, the configuration portfolio management system 104 may use a zero-shot algorithm approach that involves comparing metafeatures of the input task with metafeatures of the training tasks and identifying a model configuration that is known to perform well with a similar training task to the input task. In the example shown in FIG. 3, the online processing stage 306 produces an output of the fourth model configuration (model configuration D).

It will be noted that the first offline stage 302 and the second offline stage 304 may be performed at any time and using any number of processing resources prior to initiating the online stage 306. Indeed, the first and second offline stages 302-304 may utilize robust computing resources of a cloud computing system or other network of devices to train any number of machine learning models and evaluate performance of the machine learning models with respect to a significant number of training tasks. This may involve significant resources and take significant time. Nonetheless, as discussed herein, by performing this process offline to generate a compact configuration portfolio including a select few model configurations, the configuration portfolio management system 104 may provide a computationally inexpensive method for implementing a zero-shot or other type of algorithm to select a single model configuration for use in applying to an input task.

Figure 5:
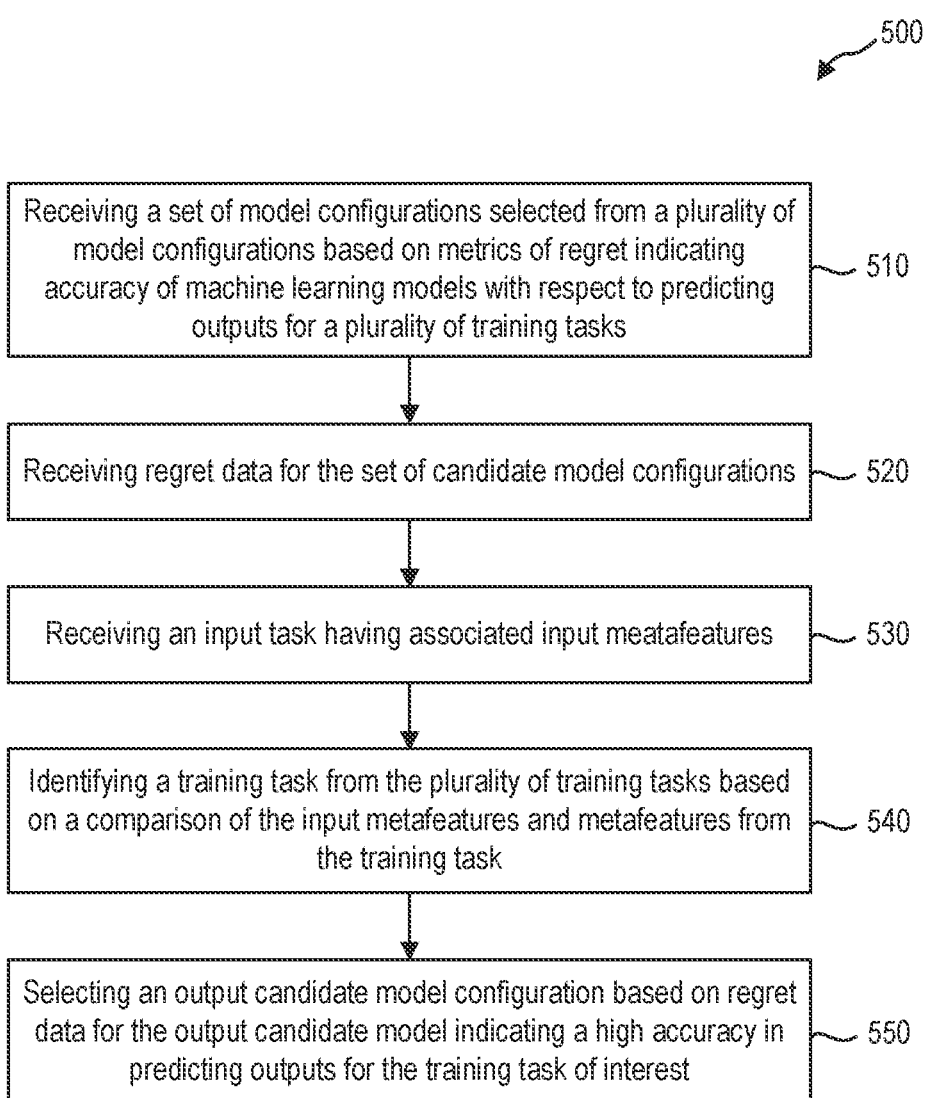
FIG. 5 illustrates a second example series of acts for utilizing a configuration portfolio to select a model configuration in accordance with one or more embodiments.

Turning now to FIGS. 4-5, these figures illustrate example flowcharts including series of acts for generating a configuration portfolio and determining a model configuration to use in connection with an input task. While FIGS. 4-5 illustrate acts according to one or more embodiments, alternative embodiments may omit, add to, reorder, and/or modify any of the acts shown in FIGS. 4-5. The acts of FIGS. 4-5 can be performed as part of a method. Alternatively, a non-transitory computer-readable medium can include instructions that, when executed by one or more processors, cause a computing device to perform the acts of FIGS. 4-5. In still further embodiments, a system can perform the acts of FIGS. 4-5.

FIG. 4 illustrates a series of acts 400 related to generating a configuration portfolio in accordance with one or more embodiments described herein. As shown in FIG. 4, the series of acts 400 includes an act 410 of receiving a plurality of model configurations including machine learning models that are compatible with a plurality of training tasks to predict outputs for the training tasks. For example, in one or more embodiments, the act 410 may include receiving a plurality of model configurations, the plurality of model configurations including a plurality of machine learning models, wherein the plurality of machine learning models are compatible with a plurality of training tasks to predict, for the plurality of training tasks, outputs based on data from the plurality of training tasks.

As further shown in FIG. 4, the series of acts 400 may include an act 420 of generating a regret matrix for the model configurations and the training tasks including a metric of regret for each model configuration associated with accuracy in predicting outputs for each of the training tasks. For example, in one or more embodiments, the act 420 may include generating a regret matrix for the plurality of model configurations and the plurality of training tasks, the regret matrix including a metric of regret for each model configuration from the plurality of model configurations with respect to accuracy in predicting outputs for each training task from the plurality of training tasks.

As further shown in FIG. 4, the series of acts 400 may include an act 430 of generating a configuration portfolio including a subset of model configurations of the plurality of model configurations based on the metrics of regret. For example, in one or more embodiments, the act 430 may involve generating a configuration portfolio including a subset of model configurations of the plurality of model configurations based on the subset of model configurations having lower metrics of regret than other model configurations from the plurality of model configurations.

As further shown in FIG. 4, the series of acts 400 may include an act 440 of providing the configuration portfolio to a computing device for identifying an output model configuration from the configuration portfolio based on metafeatures of an input task. For example, in one or more embodiments, the act 440 may include providing the configuration portfolio to a computing device for use in selectively identifying an output model configuration from the configuration portfolio based on a comparison of metafeatures of an input task and metafeatures of the plurality of training tasks.

In one or more embodiments, the series of acts 400 may include determining a set of candidate model configurations from the plurality of model configurations based on accuracy of the set of candidate models in predicting outputs for the plurality of training tasks where the subset of model configurations is a subset of model configurations from the set of candidate model configurations. In one or more embodiments, determining the set of candidate model configurations includes identifying at least one candidate model having a performance metric that exceeds a minimum performance metric for each of the training tasks from the plurality of training tasks.

In one or more embodiments, the series of acts 400 includes identifying the plurality of training tasks from a collection of training tasks based on a diversity of values of the metafeatures of the plurality of training tasks. For example, in one or more implementations, the diversity of values of the metafeatures of the plurality of training tasks includes metafeature values that range at least two orders of magnitude between two or more training sets from the plurality of training sets.

In one or more embodiments, generating the regret matrix includes evaluating accuracy of each model configuration from the plurality of model configurations with respect to each training task from the plurality of training tasks. Generating the regret matrix may additionally include determining a combined metric of regret for each model configuration from the plurality of model configurations based on a sum of metrics of regret for each model configuration with respect to the plurality of training tasks.

In one or more embodiments, the metric of regret indicates a difference in performance between a given model configuration from the plurality of model configurations and a best performing model configuration from the plurality of model configurations with respect to a training task from the plurality of training tasks. In one or more embodiments, the metric of regret is based on a minimum threshold difference in performance between two given model configurations with respect to the training task from the plurality of training tasks such that the metric of regret is equal to (1) a value of zero if the difference in performance between the two given models is less than or equal to the minimum threshold difference and/or (2) a value of the difference in performance less the minimum threshold difference if the difference in performance between the two given models is greater than the minimum threshold difference.

In one or more embodiments, providing the configuration portfolio to the computing device causes the computing device to selectively identify the output model configuration. The selection of the output model configuration may be based on a first set of input metafeatures associated with the input task is more similar to a first set of training metafeatures associated with a first training task than other sets of metafeatures associated with other training tasks from the plurality of training tasks and the output model configuration is known to have a higher metric of performance with respect to the first training task than other model configurations from the configuration portfolio.

Further, in one or more embodiments, the metafeatures may refer to a variety of characteristics of the tasks. For example, with respect to the input task (and similarly the training tasks), the metafeatures may include one or more of a number of instances of a dataset of the input task, a number of features of the dataset of the input task, a number of classes of the dataset of the input task, and/or a percentage of numeric features of the dataset of the input task.

FIG. 5 illustrates an example implementation in which a configuration portfolio is received and utilized to determine a configuration model to apply to an input task. As shown in FIG. 5, a series of acts 500 includes an act 510 of receiving a set of model configurations selected from a plurality of model configurations based on metrics of regret indicating accuracy of machine learning models with respect to predicting outputs for a plurality of training tasks. For example, in one or more embodiments, the act 510 may include receiving a set of candidate model configurations selected from a plurality of model configurations based on metrics of regret indicating accuracy of machine learning models from the candidate model configurations with respect to predicting outputs for a plurality of training tasks based on dataset features of the plurality of training tasks.

As further shown in FIG. 5, the series of acts 500 may include an act 520 of receiving regret data for the set of candidate model configurations. For example, in one or more embodiments, the act 520 includes receiving regret data for the set of candidate model configurations used in determining the candidate model configurations to include within the set of candidate model configurations. As further shown, the series of acts 500 may include an act 530 of receiving an input task having associated input metafeatures. In one or more embodiments, the act 530 may involve receiving an input task having a set of input metafeatures.

As further shown in FIG. 5, the series of acts 500 may include an act 540 of identifying a training task from the plurality of training tasks based on a comparison of the input metafeatures and metafeatures of the training task. For example, in one or more embodiments, the act 540 may include identifying a training task of interest from the plurality of training tasks based on a comparison of the set of input metafeatures with a set of training metafeatures of the training task of interest.

As further shown in FIG. 5, the series of acts 500 may include an act 550 of selecting an output candidate model configuration based on regret data for the output candidate model indicating a high accuracy in predicting outputs for the training task of interest. For example, in one or more embodiments, the act 550 may include selecting an output candidate model configuration based on the regret data for the output candidate model configuration having a high metric of accuracy in predicting outputs for the training task of interest.

In one or more embodiments, the input task does not include known labels associated with corresponding dataset features. In this example, the series of acts 500 may include applying a machine learning model of the output candidate model to the input task to predict output labels for the input task.

In one or more embodiments, the metafeatures of the input task may include similar metafeatures as discussed in connection with one or more examples above. In one or more embodiments, identifying the training task of interest includes mapping the set of input metafeatures to a first location within a multi-dimensional space, mapping multiple sets of training metafeatures of the plurality of training tasks to multiple locations within the multi-dimensional space, and determining that a location associated with the training task of interest is closer to the first location within the multi-dimensional space than other locations associated with other training tasks from the plurality of training tasks.

In one or more embodiments, the plurality of training tasks is selected based on a diversity of values of the metafeatures of the plurality of training tasks. For example, the diversity of values of the metafeatures of the plurality of training tasks may include metafeature values that range at least two orders of magnitude between two or more training sets from the plurality of training sets.

Figure 6:
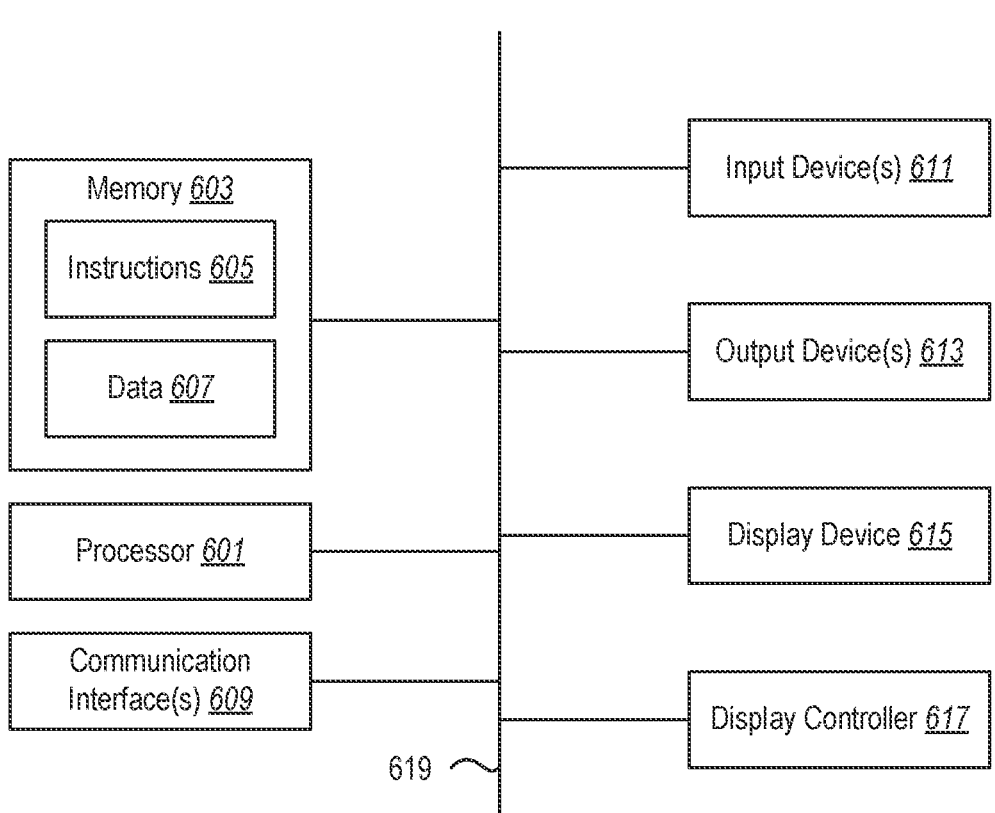
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used. In one or more embodiments, the computer system 600 further includes one or more graphics processing units (GPUs), which can provide processing services related to both entity classification and graph generation.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
  receiving a plurality of model configurations, the plurality of model configurations including a plurality of machine learning models, wherein the plurality of machine learning models are compatible with a plurality of training tasks to predict, for the plurality of training tasks, outputs based on data from the plurality of training tasks;
  generating, during an offline process, a regret matrix for the plurality of model configurations and the plurality of training tasks, the regret matrix including a metric of regret for each model configuration from the plurality of model configurations with respect to accuracy in predicting outputs for each training task from the plurality of training tasks, wherein generating the regret matrix comprises, for at least one model configuration of the plurality of model configurations:
    initiating evaluation of a predicted performance of the at least one model configuration with respect to the plurality of training tasks by applying a machine learning model of the at least one model configuration to the plurality of training tasks;
    determining a metric of regret of the at least one model configuration based on the predicted performance of the at least one model configuration with respect to the plurality of training tasks;
    prior to completing evaluation of the predicted performance of the at least one model configuration with respect to the plurality of training tasks, determining that a target metric of regret has been reached; and
    stopping evaluation of the predicted performance of the at least one model configuration based on the target metric of regret being reached;
  generating, during the offline process, a configuration portfolio including a subset of model configurations of the plurality of model configurations based on the subset of model configurations having lower metrics of regret than other model configurations from the plurality of model configurations, the subset of model configurations excluding the at least one model configuration; and
  providing the configuration portfolio to a computing device for use in selectively identifying an output model configuration from the configuration portfolio during an online process and based on a comparison of metafeatures of an input task and metafeatures of the plurality of training tasks.

2. The method of claim 1, further comprising determining a set of candidate model configurations from the plurality of model configurations based on accuracy of the set of candidate model configurations in predicting outputs for the plurality of training tasks, and wherein the subset of model configurations is a subset of model configurations from the set of candidate model configurations.

3. The method of claim 2, wherein determining the set of candidate model configurations includes identifying at least one candidate model having a performance metric that exceeds a minimum performance metric for each of the training tasks from the plurality of training tasks.

4. The method of claim 1, further comprising identifying the plurality of training tasks from a collection of training tasks based on values of the metafeatures of the plurality of training tasks having ranges of values across one or multiple orders of magnitude from one another across the plurality of training tasks.

5. The method of claim 4, wherein the metafeatures of the plurality of training tasks have values that range at least two orders of magnitude between two or more training tasks from the plurality of training tasks.

6. The method of claim 1, wherein generating the regret matrix includes:
  evaluating accuracy of each model configuration from the plurality of model configurations with respect to each training task from the plurality of training tasks; and
  determining a combined metric of regret for each model configuration from the plurality of model configurations based on a sum of metrics of regret for each model configuration with respect to the plurality of training tasks.

7. The method of claim 1, wherein the metric of regret indicates a difference in performance between a given model configuration from the plurality of model configurations and a best performing model configuration from the plurality of model configurations with respect to a training task from the plurality of training tasks.

8. The method of claim 7, wherein the metric of regret is based on a minimum threshold difference in performance between two given model configurations with respect to the training task from the plurality of training tasks such that the metric of regret is equal to:
  a value of zero if the difference in performance between the two given models is less than or equal to the minimum threshold difference; and
  a value of the difference in performance less the minimum threshold difference if the difference in performance between the two given models is greater than the minimum threshold difference.

9. The method of claim 1, wherein providing the configuration portfolio to the computing device causes the computing device to selectively identify the output model configuration based on determining that:
  a first set of input metafeatures associated with the input task is more similar to a first set of training metafeatures associated with a first training task than other sets of metafeatures associated with other training tasks from the plurality of training tasks, and
  the output model configuration is known to have a higher metric of performance with respect to the first training task than other model configurations from the configuration portfolio.

10. The method of claim 1, wherein the metafeatures of the input task include one or more of:
  a number of instances of a dataset of the input task;
  a number of features of the dataset of the input task;
  a number of classes of the dataset of the input task; and
  a percentage of numeric features of the dataset of the input task.

11. A system, comprising:

at least one processor;

memory in electronic communication with the at least one processor; and instructions stored in the memory, the instructions being executable by the at least one processor to:

receive a plurality of model configurations, the plurality of model configurations including a plurality of machine learning models, wherein the plurality of machine learning models are compatible with a plurality of training tasks to predict, for the plurality of training tasks, outputs based on data from the plurality of training tasks;

generate, during an offline process, a regret matrix for the plurality of model configurations and the plurality of training tasks, the regret matrix including a metric of regret for each model configuration from the plurality of model configurations with respect to accuracy in predicting outputs for each training task from the plurality of training tasks wherein generating the regret matrix comprises, for at least one model configuration of the plurality of model configurations:

initiating evaluation of a predicted performance of the at least one model configuration with respect to the plurality of training tasks by applying a machine learning model of the at least one model configuration to the plurality of training tasks;

determining a metric of regret of the at least one model configuration based on the predicted performance of the at least one model configuration with respect to the plurality of training tasks;

prior to completing evaluation of the predicted performance of the at least one model configuration with respect to the plurality of training tasks, determining that a target metric of regret has been reached; and stopping evaluation of the predicted performance of the at least one model configuration based on the target metric of regret being reached;

generate, during the offline process, a configuration portfolio including a subset of model configurations of the plurality of model configurations based on the subset of model configurations having lower metrics of regret than other model configurations from the plurality of model configurations, the subset of model configurations excluding the at least one model configuration; and provide the configuration portfolio to a computing device for use in selectively identifying an output model configuration from the configuration portfolio during an online process and based on a comparison of metafeatures of an input task and metafeatures of the plurality of training tasks.

12. The system of claim 11, further comprising instructions being executable by the at least one processor to determine a set of candidate model configurations from the plurality of model configurations based on accuracy of the set of candidate model configurations in predicting outputs for the plurality of training tasks, and wherein the subset of model configurations is a subset of model configurations from the set of candidate model configurations.

13. The system of claim 11, further comprising instructions being executable by the at least one processor to identify the plurality of training tasks from a collection of training tasks based on values of the metafeatures of the plurality of training tasks having ranges of values across one or multiple orders of magnitude from one another across the plurality of training tasks.

14. The system of claim 11, wherein the metafeatures of the input task include one or more of:

a number of instances of a dataset of the input task;

a number of features of the dataset of the input task;

a number of classes of the dataset of the input task; and a percentage of numeric features of the dataset of the input task.

15. The system of claim 11, wherein determining the set of candidate model configurations includes identifying at least one candidate model having a performance metric that exceeds a minimum performance metric for each of the training tasks from the plurality of training tasks.

16. The system of claim 13, wherein the metafeatures of the plurality of training tasks have values that range at least two orders of magnitude between two or more training tasks from the plurality of training tasks.

17. The system of claim 11, wherein the metafeatures of the input task include a number of instances of a dataset of the input task, and further comprising instructions being executable by the at least one processor to identify the plurality of training tasks from a collection of training tasks based on numbers of instances of datasets of the plurality of training tasks having ranges of values across multiple orders of magnitude between two or more training tasks from the plurality of training tasks.

18. The system of claim 11, wherein the metafeatures of the input task include a number of features of the dataset of the input task, and further comprising instructions being executable by the at least one processor to identify the plurality of training tasks from a collection of training tasks based on numbers of features of datasets of the plurality of training tasks having ranges of values across multiple orders of magnitude between two or more training tasks from the plurality of training tasks.

19. The system of claim 11, wherein the metafeatures of the input task include a number of classes of the dataset of the input task, and further comprising instructions being executable by the at least one processor to identify the plurality of training tasks from a collection of training tasks based on numbers of classes of datasets of the plurality of training tasks having ranges of values across multiple orders of magnitude between two or more training tasks from the plurality of training tasks.

* * * * *